United States Patent
Von Hein et al.

(10) Patent No.: US 11,429,559 B2
(45) Date of Patent: Aug. 30, 2022

(54) COMPLIANCE RECYCLING ALGORITHM FOR SCHEDULED TARGETLESS SNAPSHOTS

(71) Applicant: EMC IP HOLDING COMPANY LLC, Hopkinton, MA (US)

(72) Inventors: Nicholas Von Hein, Riverside, RI (US); Michael Ferrari, Douglas, MA (US); Daryl Kinney, Hopkinton, MA (US); Shakil Anwar, Westborough, MA (US); Tao Tao, Cambridge, MA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 200 days.

(21) Appl. No.: 16/886,848

(22) Filed: May 29, 2020

(65) Prior Publication Data

US 2021/0374096 A1    Dec. 2, 2021

(51) Int. Cl.
*G06F 16/11* (2019.01)
(52) U.S. Cl.
CPC .................. *G06F 16/128* (2019.01)
(58) Field of Classification Search
CPC .................................................. G06F 16/128
USPC ........................................................ 707/654
See application file for complete search history.

(56) References Cited

U.S. PATENT DOCUMENTS

| | | | | |
|---|---|---|---|---|
| 7,882,067 B2 * | 2/2011 | Saika | ..................... | G06F 16/128 707/649 |
| 7,904,425 B2 * | 3/2011 | Cannon | ............... | G06F 11/1451 707/662 |
| 8,261,030 B2 * | 9/2012 | Mehra | ................... | G06F 3/0683 711/159 |
| 9,529,808 B1 * | 12/2016 | Sudarsanam | ......... | G06F 16/211 |
| 10,102,083 B1 * | 10/2018 | Dobrean | ............... | G06F 16/113 |
| 10,248,336 B1 * | 4/2019 | Koujalagi | ........... | G06F 11/1484 |
| 10,324,803 B1 * | 6/2019 | Agarwal | ............... | G06F 16/113 |
| 10,482,065 B1 * | 11/2019 | Armangau | .......... | G06F 16/1748 |
| 10,657,004 B1 * | 5/2020 | Dalmia | .................... | G06F 11/1446 |
| 10,872,059 B2 * | 12/2020 | Desai | ..................... | G06F 16/128 |
| 11,080,147 B2 * | 8/2021 | Haustein | ............. | G06F 11/1451 |
| 2003/0167380 A1 * | 9/2003 | Green | .................... | G06F 12/023 714/E11.119 |
| 2004/0107199 A1 * | 6/2004 | Dalrymple, III | ..... | G06F 11/1451 |
| 2006/0271604 A1 * | 11/2006 | Shoens | ................. | G06F 16/128 |
| 2007/0266056 A1 * | 11/2007 | Stacey | .................. | G06F 16/185 707/999.203 |
| 2008/0281875 A1 * | 11/2008 | Wayda | ................ | G06F 11/1435 |
| 2008/0281877 A1 * | 11/2008 | Wayda | ................ | G06F 11/1435 |

(Continued)

*Primary Examiner* — Phuong Thao Cao
(74) *Attorney, Agent, or Firm* — Anderson Gorecki LLP

(57) ABSTRACT

Targetless snapshots that are in use are excluded from discard and exempted from inclusion against a snapshot retention count limit. Snapshots that are linked to a target volume are considered to be in use. Snapshots having a persist attribute set are considered to be in use. Snapshots having an expiration attribute set are considered to be in use until at least the expiration time. Snapshots having an age limit attribute set are considered to be in use until reaching at least the specified age. The snapshot retention count limit can be updated with a command. Other commands discard snapshots created before a specified time or older than a specified age, provided the snapshots are not in use. A terminate all command prompts discard of all snapshots that are not in use.

20 Claims, 16 Drawing Sheets

(56) References Cited

U.S. PATENT DOCUMENTS

| | | | |
|---|---|---|---|
| 2012/0317079 A1* | 12/2012 | Shoens | G06F 11/2094 707/E17.007 |
| 2014/0052953 A1* | 2/2014 | Ben-Tsion | G06F 3/0605 711/172 |
| 2015/0127614 A1* | 5/2015 | Williams | G06F 3/065 707/649 |
| 2015/0242283 A1* | 8/2015 | Simoncelli | G06F 11/1456 711/162 |
| 2017/0031776 A1* | 2/2017 | Ren | G06F 11/1451 |
| 2018/0121454 A1* | 5/2018 | Kushwah | G06F 12/121 |
| 2019/0065322 A1* | 2/2019 | Chakankar | G06F 11/1471 |
| 2019/0213123 A1* | 7/2019 | Agarwal | G06F 3/0608 |
| 2019/0324947 A1* | 10/2019 | Lv | G06F 11/1451 |
| 2019/0339889 A1* | 11/2019 | Lu | G06F 3/0647 |
| 2019/0347033 A1* | 11/2019 | Wei | G06F 3/0673 |
| 2020/0019620 A1* | 1/2020 | Sarda | G06F 3/0608 |
| 2020/0065196 A1* | 2/2020 | Desai | G06F 11/1484 |
| 2020/0099692 A1* | 3/2020 | Jindal | G06F 11/1438 |
| 2020/0327097 A1* | 10/2020 | Birka | G06F 16/1727 |

* cited by examiner

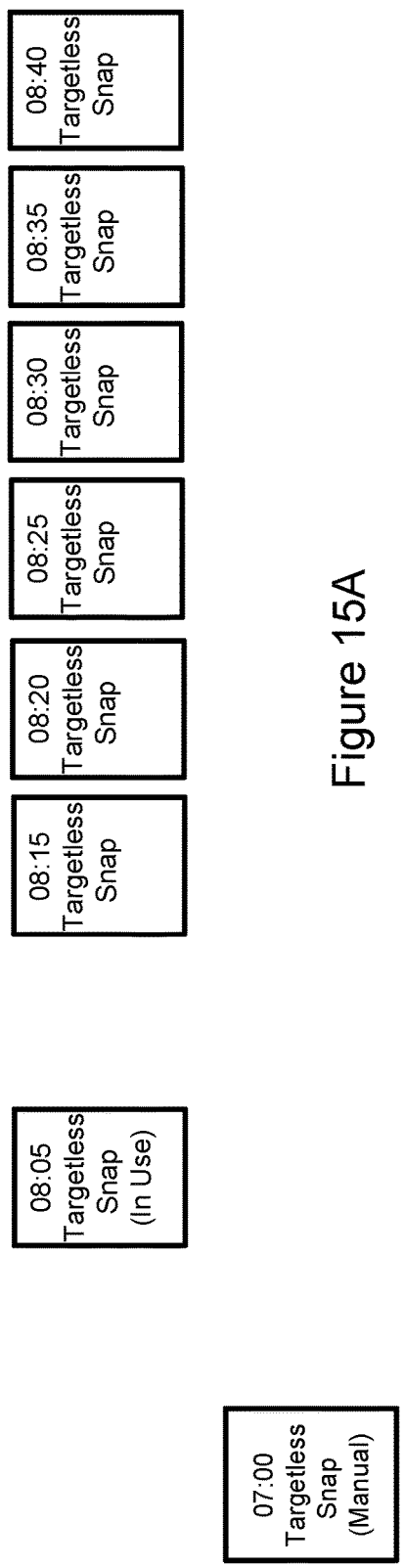
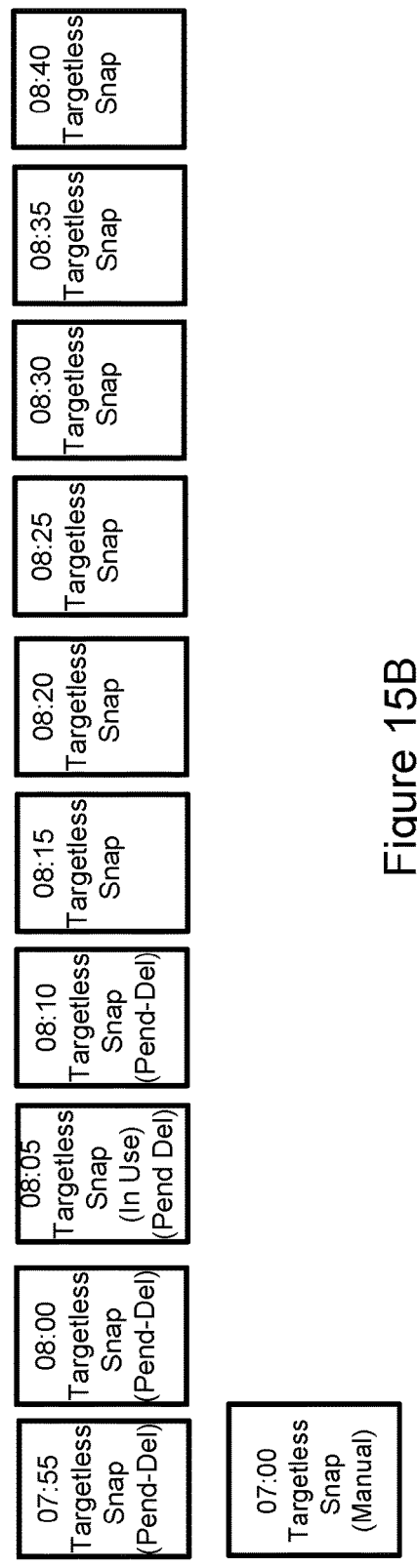

Time=08:40 Interval=5 minutes Count=10 Terminate All Command Received

08:05
Targetless
Snap
(In Use)

07:00
Targetless
Snap
(Manual)

Figure 16

COMPLIANCE RECYCLING ALGORITHM FOR SCHEDULED TARGETLESS SNAPSHOTS

TECHNICAL FIELD

The subject matter of this disclosure is generally related to data storage systems and more particularly to retention of targetless snapshots.

BACKGROUND

High capacity data storage systems such as storage area networks (SANs) are used to maintain large data sets and contemporaneously support multiple users. A SAN includes a network of interconnected compute nodes that manage access to arrays of drives. The compute nodes respond to block-based input-output (IO) commands from "host applications" that run on host servers. Examples of host applications may include, but are not limited to, software for email, accounting, manufacturing, inventory control, and a wide variety of other business processes. SANs and other types of high capacity data storage systems create copies of storage objects for disaster recovery and other purposes. A clone is a complete copy of a storage object such as a logical volume of storage. In contrast with clones, snapshots (snaps) are incremental copies of a storage object. Each snap only represents the changes made since some prior point in time, e.g. since creation of the most recent snap of the storage object. Advantageously, snaps are smaller than the storage object being snapped, so snap generation is faster and requires less resources than creating a clone or other type of complete copy of the storage object.

A common technique for generating a snap of a source volume is to write changed data to a target volume (aka, a snap volume). The snap volume may be accessible to the host servers and host applications. However, creating and managing snap volumes requires memory and other resources. Further, a single SAN may have many snap volumes, so the total amount of resources required by snaps may be significant. A different type of snapshot, known generally as a targetless snap, requires less resources to create than a standard volume-based snap. Targetless snaps are created as changes are made to the storage object being snapped. More particularly, snapshot deltas are created using tables and pointers to the original data as new writes are made. The snapshot deltas are accumulated over time, thereby creating a targetless snap. Because the snapshot deltas are not stored on a snap volume, targetless snapshots require fewer resources than standard volume-based snapshots. However, the lack of a snap volume also prevents targetless snaps from being discoverable and accessible to host servers unless the targetless snap is linked to a logical volume.

SUMMARY

All examples, aspects and features mentioned in this document can be combined in any technically possible way.

An apparatus in accordance with some implementations of the invention may comprise: a data storage system comprising: a plurality of compute nodes interconnected with a plurality of drives; a plurality of storage objects on which data is logically stored, the storage objects being backed by the drives; and a targetless snapshot scheduler that controls creation of targetless snapshots of a first one of the storage objects, the targetless snapshot scheduler comprising: snapshot creation instructions that create targetless snapshots of the first storage object in accordance with a first schedule associated with the first storage object; and snapshot recycling instructions that: determine whether a total number of targetless snapshots of the first storage object based on the first schedule inclusive of a new targetless snapshot exceeds a predetermined count; and responsive to a determination that the total number of targetless snapshots of the first storage object based on the first schedule inclusive of the new targetless snapshot exceeds the predetermined count: select an oldest one of the targetless snapshots of the first storage object based on the first schedule; discard the selected snapshot responsive to a determination that the selected snapshot is not in use; and exempt the selected snapshot from consideration relative to the predetermined count responsive to a determination that the selected snapshot is in use.

A method in accordance with some implementations comprises: in a data storage system comprising a plurality of compute nodes interconnected with a plurality of drives and a first storage object on which data is logically stored, the first storage object being backed by the drives: creating targetless snapshots of the first storage object in accordance with a first schedule associated with the first storage object; determining whether a total number of targetless snapshots of the first storage object based on the first schedule inclusive of a new targetless snapshot exceeds a predetermined count; and responsive to determining that the total number of targetless snapshots of the first storage object based on the first schedule inclusive of the new targetless snapshot exceeds the predetermined count: selecting an oldest one of the targetless snapshots of the first storage object based on the first schedule; discarding the selected snapshot responsive to determining that the selected snapshot is not in use; and exempting the selected snapshot from consideration relative to the predetermined count responsive to determining that the selected snapshot is in use.

In accordance with some implementations a computer-readable storage medium stores instructions that when executed by a computer cause the computer to perform a method for using a computer system to manage targetless snapshots, the method comprising: creating targetless snapshots of a storage object in accordance with a schedule associated with the storage object; determining whether a total number of targetless snapshots of the storage object based on the schedule inclusive of a new targetless snapshot exceeds a predetermined count; and responsive to determining that the total number of targetless snapshots of the storage object based on the schedule inclusive of the new targetless snapshot exceeds the predetermined count: selecting an oldest one of the targetless snapshots of the storage object based on the schedule; discarding the selected snapshot responsive to determining that the selected snapshot is not in use; and exempting the selected snapshot from consideration relative to the predetermined count responsive to determining that the selected snapshot is in use.

Other aspects, features, and implementations will be apparent in view of the detailed description and figures.

BRIEF DESCRIPTION OF THE FIGURES

FIG. 15A illustrates application of a point-in-time-based discard command to the series of targetless snapshots of FIG. 14A.

FIG. 15B illustrates application of an age-based discard command to the series of targetless snapshots of FIG. 14A.

FIG. 16 illustrates application of a terminate all command to the series of targetless snapshots of FIG. 14A.

DETAILED DESCRIPTION

The terminology used in this disclosure is intended to be interpreted broadly within the limits of subject matter eligibility. The terms "disk" and "drive" are used interchangeably herein and are not intended to refer to any specific type of non-volatile storage media. The terms "logical" and "virtual" are used to refer to features that are abstractions of other features, e.g. and without limitation abstractions of tangible features. The term "physical" is used to refer to tangible features that possibly include, but are not limited to, electronic hardware. For example, multiple virtual computers could operate simultaneously on one physical computer.

Some aspects, features, and implementations described herein may include machines such as computers, electronic components, optical components, and processes such as computer-implemented procedures and steps. It will be apparent to those of ordinary skill in the art that the computer-implemented procedures and process steps may be stored as computer-executable instructions on a non-transitory computer-readable medium. Furthermore, it will be understood by those of ordinary skill in the art that the computer-executable instructions may be executed on a variety of tangible processor devices, i.e. physical hardware. For practical reasons, not every step, device, and component that may be part of a computer or data storage system is described herein. Those of ordinary skill in the art will recognize such steps, devices, and components in view of the teachings of the present disclosure and the knowledge generally available to those of ordinary skill in the art. The corresponding machines and processes are therefore enabled and within the scope of the disclosure.

Figure 1:
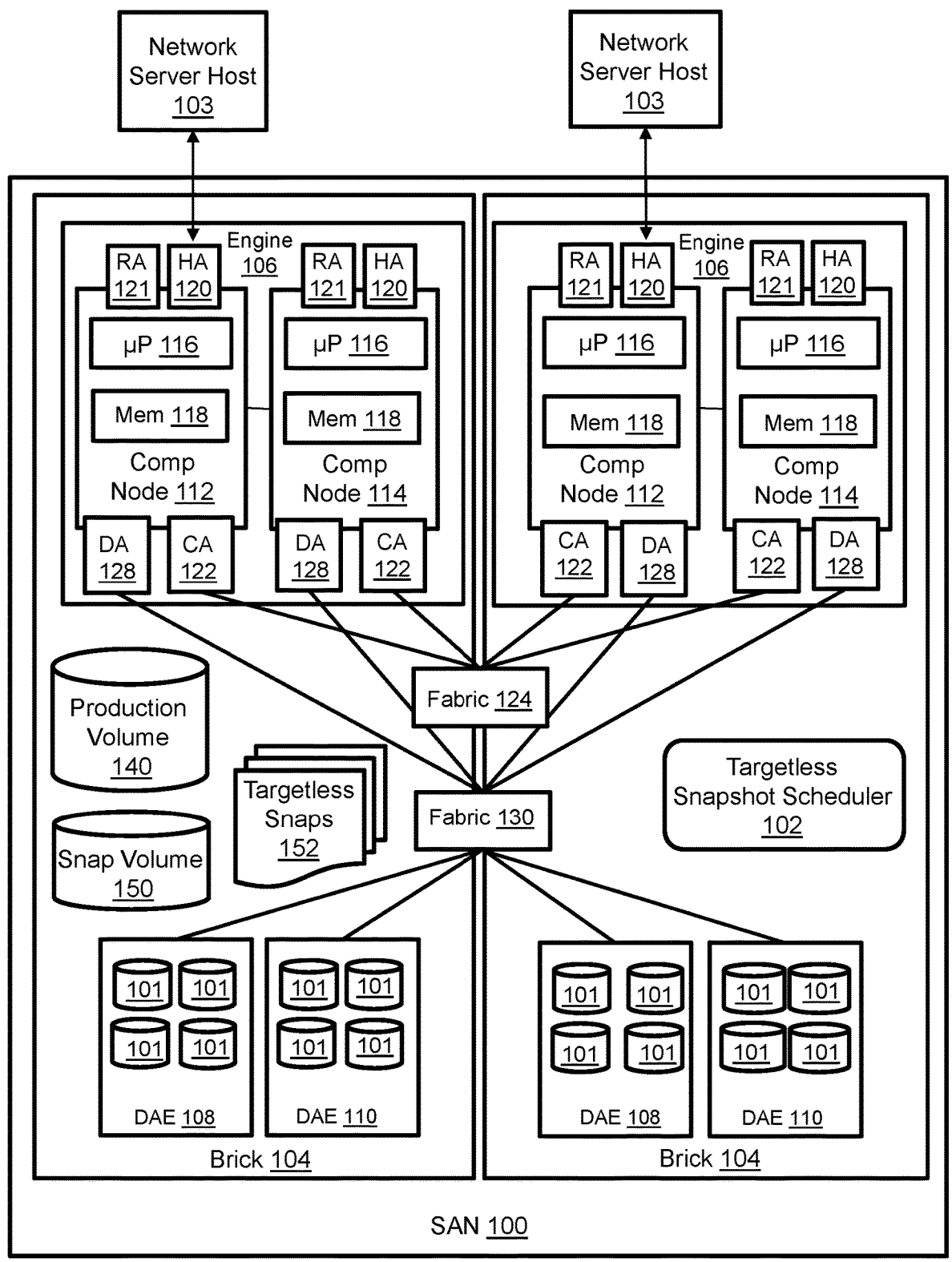
FIG. 1 illustrates a storage array with a targetless snapshot scheduler that uses a compliance recycling algorithm to control retention of targetless snapshots.

FIG. 1 illustrates a storage area network (SAN) 100 with a targetless snapshot scheduler 102 that implements multiple targetless snapshot schedules that are concurrently applied to the same storage object. Targetless snapshots may be generated manually or automatically. One drawback of automatic targetless snap creation is that storage system resources may be consumed to exhaustion if new snaps are regularly created and old snaps are not discarded. It is possible to automate discard of targetless snaps, e.g. by discarding the oldest snaps. However, simply discarding the oldest snapshots inhibits implementation of different targetless snapshot schedules. An automated integrated targetless snapshot schedule for a storage object may include both a low count, long interval schedule and a high count, short interval schedule. Due to simple age-based discard, the creation of snaps pursuant to the short interval schedule will cause discard of the long interval schedule snaps, thereby negating the utility of the long interval schedule. The disclosed targetless snapshot scheduler helps to overcome this problem by implementing concurrent independent targetless snapshot schedules for the same storage object. Further, a compliance recycling algorithm can be selected to prevent instances of snaps that are in-use from causing relatively recent targetless snaps of the same schedule to be discarded due to automated cannibalistic recycling. Further, a variety of targetless snapshot discard commands can be used to efficiently discard snaps for one or more storage objects and schedules using a single command, e.g. based on a new count, point-in-time, or age.

The specifically illustrated SAN 100 is a storage array that includes a network of compute nodes 112, 114 that manage access to arrays of drives using interconnecting fabrics 124, 130 rather than switches for communication. The SAN is depicted in a simplified data center environment that includes two network servers 103 that functions as "hosts." The network servers include volatile memory, non-volatile storage, one or more tangible processors, and a hypervisor or containers. Instances of applications (known as host applications) running on each network server use data that is maintained by the SAN. Examples of host applications may include email programs, inventory control programs, and accounting programs, for example and without limitation. The SAN 100 includes one or more bricks 104. Each brick includes an engine 106 and one or more drive array enclosures (DAEs) 108, 110. Each DAE includes managed drives 101 that are non-volatile storage media such as, without limitation, solid-state drives (SSDs) based on EEPROM technology such as NAND and NOR flash memory and hard disk drives (HDDs) with spinning disk magnetic storage media. Drive controllers may be associated with the managed drives as is known in the art. Each engine 106 includes a pair of interconnected compute nodes 112, 114, which may be referred to as "storage directors." Although some of those skilled in the art may refer to the compute nodes as "hosts," that naming convention is avoided in this disclosure to distinguish the network server hosts 103 from the compute nodes 112, 114. Nevertheless, the host applications could run on the compute nodes, e.g. on virtual machines or in containers. Each compute node includes resources such as at least one multi-core processor 116 and local memory 118. The processor may include central processing units (CPUs), graphics processing units (GPUs), or both. The local memory 118 may include volatile media such as dynamic random-access memory (DRAM), non-volatile memory (NVM) such as storage class memory (SCM), or both. Each compute node may allocate a portion of its local memory to a logical shared memory that can be accessed by all compute nodes using direct memory access (DMA) techniques. Each compute node includes one or more host adapters (HAs) 120 for communicating with the hosts 103. Each host adapter has resources for servicing input-output commands (IOs) from the hosts. The resources may include processors, volatile memory, and ports via which the hosts may access the SAN. Each compute node also includes a remote adapter (RA) 121 for communicating with other storage systems. Each compute node also includes one or more drive adapters (DAs) 128 for communicating with the managed drives 101 in the DAEs 108, 110. Each drive adapter has processors, volatile memory, and ports via which the compute node may access the DAEs for servicing IOs. Each compute node may also include one or more channel adapters (CAs) 122 for communicating with other compute nodes via an interconnecting fabric 124. The paired compute nodes 112, 114 of each engine 106 provide failover protection and may be directly interconnected by communication links. An interconnecting fabric 130 enables implementation of an N-way active-active backend. A backend connection group includes all drive adapters that can access the same drive or drives. In some implementations every drive adapter 128 in the SAN can reach every DAE via the fabric 130. Further, in some implementations every drive adapter in the SAN can access every managed drive 101 in the SAN.

Data associated with the hosted application instances running on the hosts 103 is maintained on the managed drives 101. The managed drives 101 are not discoverable by the hosts 103 but the SAN 100 creates a storage object such as production volume 140 that can be discovered and accessed by the hosts. The production volume is a logical storage device that may be referred to as a production device or production LUN, where the logical unit number (LUN) is a number used to identify logical storage volumes in accordance with the small computer system interface (SCSI) protocol. From the perspective of the hosts 103, the production volume 140 is a single drive having a set of contiguous fixed-size logical block addresses (LBAs) on which data used by the instances of the host application resides. However, the host application data is stored at non-contiguous addresses on various managed drives 101. Metadata that maps between the production volume LBAs and addresses in the managed drives is maintained by the compute nodes, e.g. in the shared memory. The hosts send IOs to access LBAs of the production volume. Due to the above-described configuration the SAN functions as a block-based storage system without information that is indicative of higher-level host application data structures such as files. Filesystems indicative of such higher-level data structures may be maintained by the hosts. Although only one production volume is illustrated, the SAN may contemporaneously maintain multiple production volumes.

Volume-based snapshots of the production volume 140 may be written to a snap volume 150, which may be local or remote. Targetless snaps 152 of the production volume 140 are created by the targetless snapshot scheduler 102. New targetless snaps are created as changes are made to the production volume 140. Specifically, snapshot deltas are created using tables and pointers to the original data such that the original data and changed data continue to be stored on the managed drives. The original data may be overwritten when all associated targetless snaps have been discarded.

Figure 2:
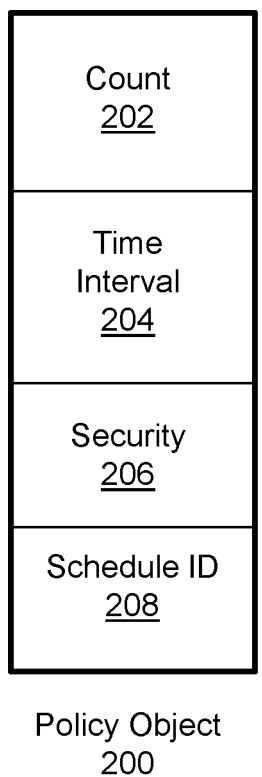
FIG. 2 illustrates a policy object that is used by the targetless snapshot scheduler.

Referring to FIG. 2, a policy object 200 defines aspects of a schedule for creation of targetless snapshots. Attributes of the policy object 200 include a count 202, a time interval 204, a security indicator 206, and a schedule ID 208. The count 202 indicates the maximum number of targetless snaps retained in accordance with the schedule. The time interval 204 is the period of elapsed time between creation of successive targetless snaps of the storage object in accordance with the schedule. The security 206 is an indication of whether the targetless snaps of the storage object taken in accordance with the schedule have a guaranteed minimum lifespan. If set, a guaranteed minimum lifespan is specified. For example, the targetless snaps could have a guaranteed lifespan defined in terms of minutes or days since creation during which the snaps cannot be discarded either manually or automatically, e.g. even if the count is exceeded. The schedule ID 208 is an identifier for the targetless snapshot schedule, and thus for the policy object 200.

Figure 3:
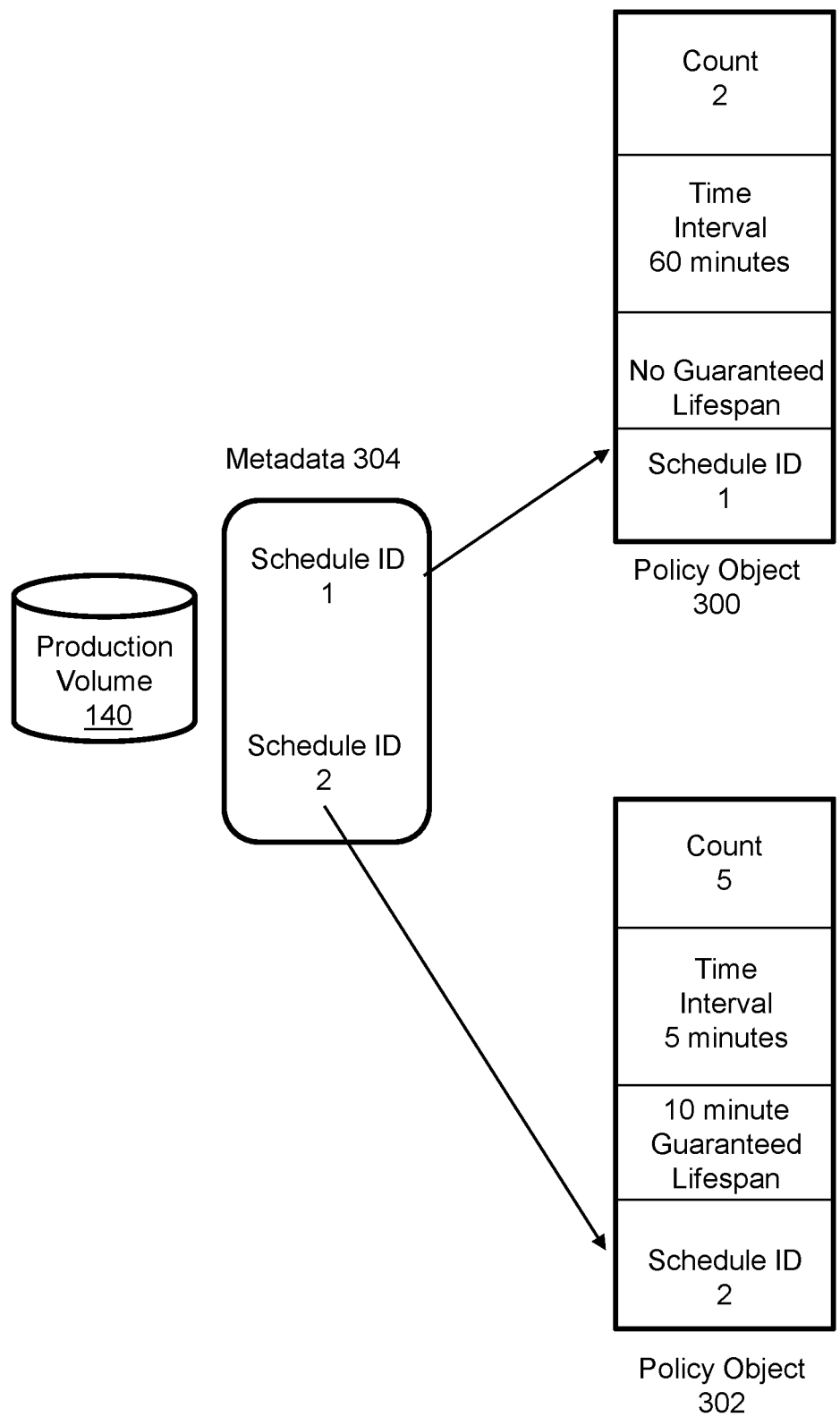
FIG. 3 illustrates association of multiple policy objects with a single storage object.

FIG. 3 illustrates association of multiple policy objects 300, 302 with the same storage object, specifically production volume 140. The targetless snap schedules defined by each policy object 300, 302 are independent and at least one of the attributes of the schedules differs. In the illustrated example policy object 300 has a count value of 2, a time interval of 60 minutes, no guaranteed minimum lifespan security, and a schedule ID "1." Policy object 302 has a count value of 5, a time interval of 5 minutes, a guaranteed minimum lifespan security of 10 minutes, and a schedule ID "2." Both schedule IDs are associated with production volume 140, e.g., in associated metadata 304 stored in the shared memory. The targetless snapshot scheduler 102 (FIG. 1) uses the metadata 304 to locate matching schedule IDs in the policy objects to determine which schedules to apply to the production volume 140. It should be understood that there may be many production volumes and many different policy objects and schedules, with only some of the schedules being applied to any given production volume.

Figure 4:
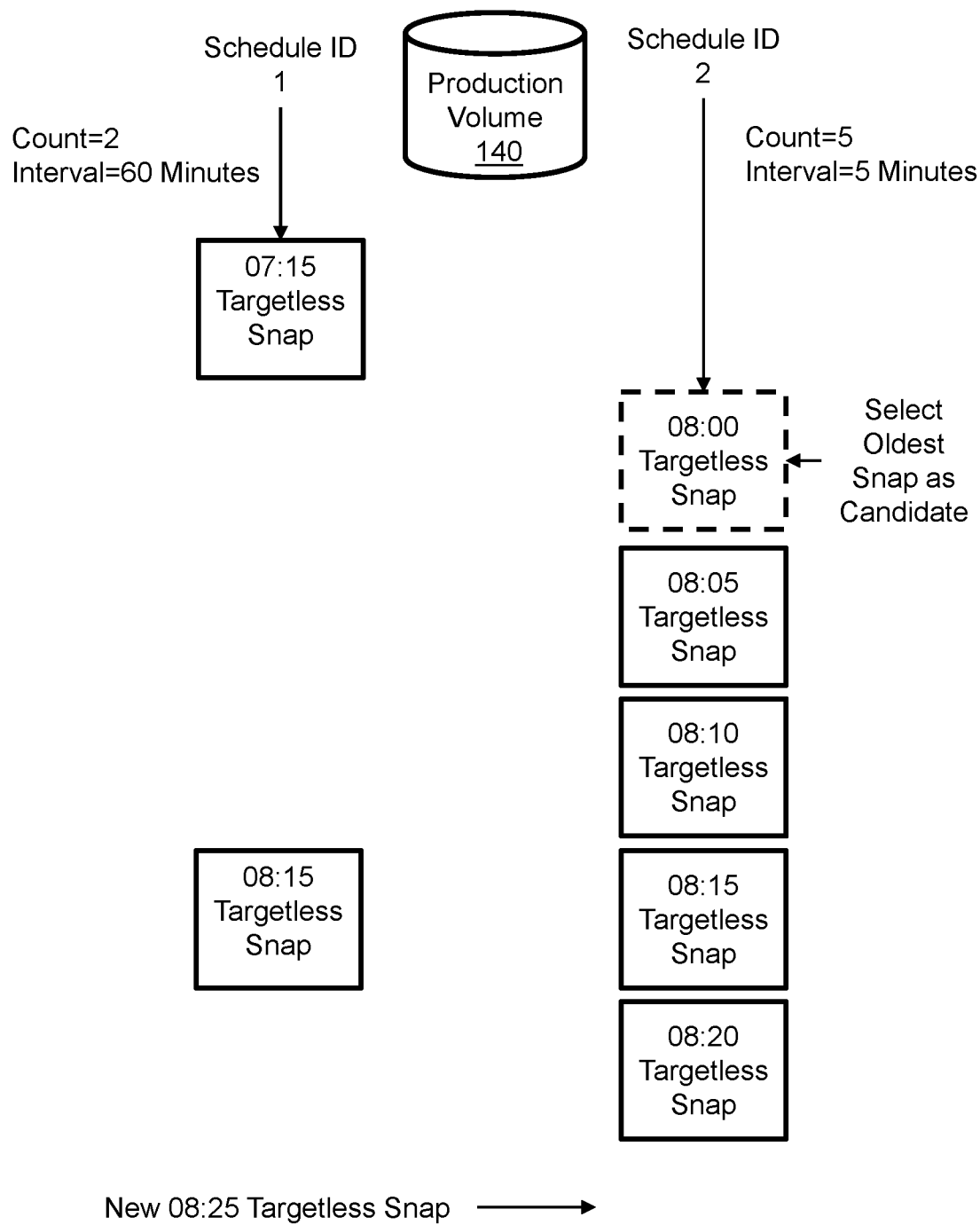
FIG. 4 illustrates contemporaneous generation of targetless snapshots of a storage object in accordance with multiple schedules.

FIG. 4 illustrates contemporaneous generation of targetless snapshots of a storage object in accordance with multiple schedules. In accordance with the targetless snap creation schedule associated with schedule ID 1 as defined in policy object 300 (FIG. 3), up to two targetless snaps of production volume 140 are maintained and the snaps are created at 60-minute intervals, resulting in an 07:15 targetless snap and an 08:15 targetless snap, where 07:15 and 08:15 are times of day at which the snapshots were created. In accordance with the targetless snap creation schedule associated with schedule ID 2 as defined in policy object 302 (FIG. 3), up to five targetless snaps of production volume 140 are maintained and the snaps are created at 5-minute intervals, resulting in an 08:00 targetless snap, an 08:05 targetless snap, an 08:10 targetless snap, an 08:15 targetless snap, and an 08:20 targetless snap.

Figure 5:
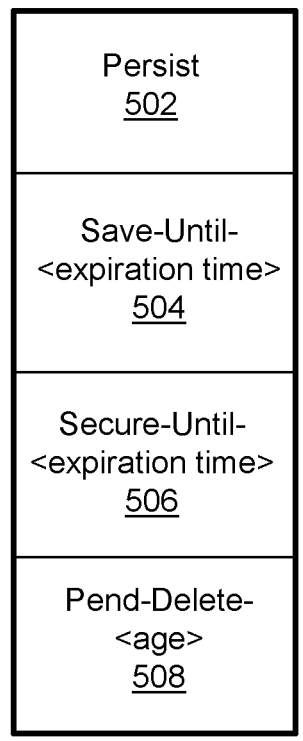
FIG. 5 illustrates attributes of a targetless snapshot.

FIG. 5 illustrates attributes of a targetless snapshot 500. Setting a persist attribute 502 excludes the snapshot from being discarded (recycled) for an unlimited amount of time. Setting a save-until-<expiration time> attribute 504 excludes the snapshot from being discarded before the specified expiration time has been reached. The expiration time, <expiration time>, is a point-in-time such as a time of day on a specified date. Setting a save-until-<expiration time> attribute 506 prioritizes snapshot data and prevents selected operations including and in addition to discard from being applied to the snapshot before the specified expiration time has been reached. Setting a pend-delete-<age> attribute 508 excludes the snapshot from being discarded for an elapsed time, <age>, since the snapshot was created. For example, the targetless snapshot may be excluded from discard for 10 minutes from creation or 1 day from creation. The discard may be done in the background, so recycling does not necessarily occur precisely at the specified <age>. Clearing (un-setting) an attribute ceases application of the corresponding protections to the snapshot.

Figure 6:
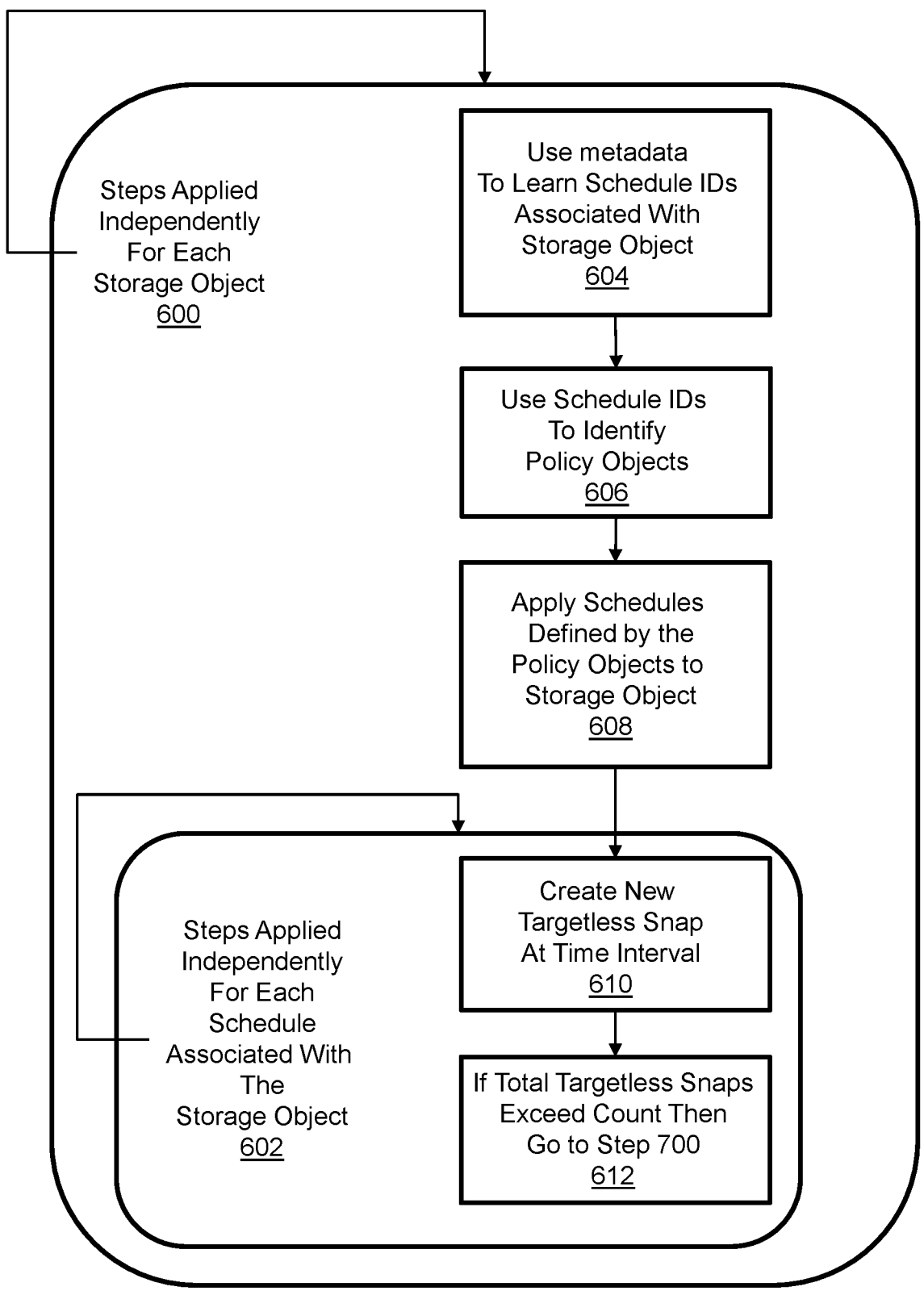
FIG. 6 illustrates operation of the targetless snapshot scheduler in greater detail.

FIG. 6 illustrates operation of the targetless snapshot scheduler in greater detail. A first group 600 of steps are applied independently for each storage object for which targetless snaps are created. Consequently, when the same policy object is associated with multiple storage objects the corresponding targetless snapshot schedule is applied independently to each of the storage objects. For example, snaps of a first production volume are not included in the count of snaps of a second production volume. A sub-group 602 of the steps are applied independently for each targetless snapshot schedule associated with a selected storage object. Consequently, when multiple policy objects are associated with a single storage object the corresponding schedules are applied independently. For example, snaps of a production volume created pursuant to a first schedule are not included in the count of snaps of the production volume created pursuant to a second schedule. Step 604 is to use the metadata in the shared memory to learn the schedule IDs associated with a selected storage object. The schedule IDs are used to identify corresponding policy objects as indicated in step 606. The schedules defined by the identified policy objects are applied to the storage object as indicated in step 608. Pursuant to each of those schedules, new targetless snaps are created at the time interval indicated in the corresponding policy object as indicated at step 610. If the number of retained targetless snaps plus the new snap exceeds the count indicated in the corresponding policy object, then flow proceeds to step 700 (FIG. 7) as indicated in step 612. The steps are repeated in continuous loops for each storage object and schedule.

Figure 7:
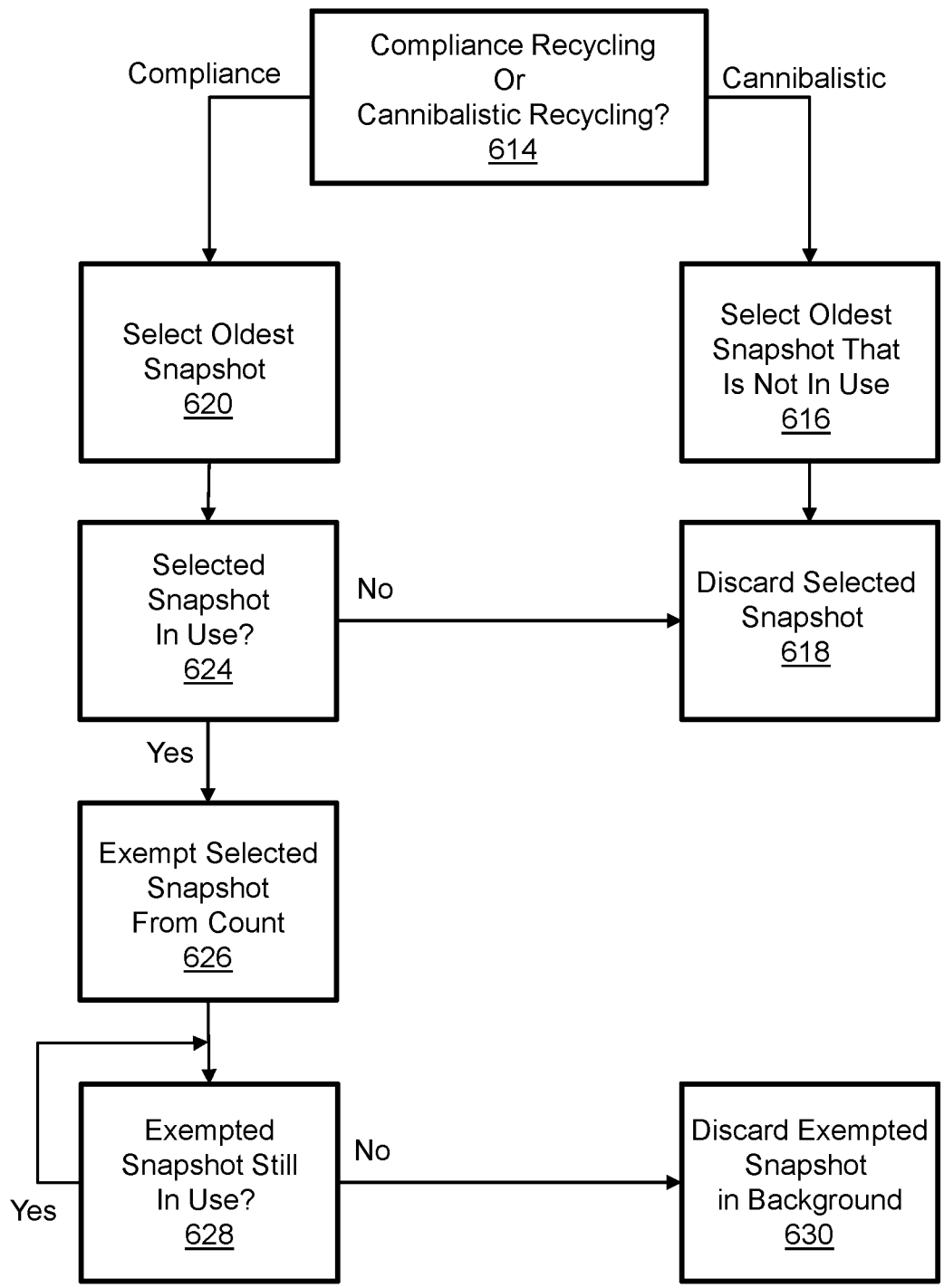
FIG. 7 illustrates step 612 of FIG. 6 in greater detail, including operation of the compliance recycling algorithm.

FIG. 7 illustrates step 612 of FIG. 6 in greater detail, including operation of the compliance recycling algorithm. Having determined in step 612 (FIG. 6) that the total number of retained targetless snapshots plus the new snap exceeds the snap retention count limit indicated in the corresponding policy object, the targetless snapshot scheduler determines whether compliance recycling or cannibalistic recycling is enabled as indicated in step 614. If cannibalistic recycling is enabled, then the oldest snapshot that is not currently in use is selected in step 616. The selected snapshot is recycled, i.e. discarded, as indicated in step 618. If compliance recycling is enabled, then the oldest snapshot for the schedule and storage object is selected as indicated in step 620. The targetless snapshot scheduler determines whether the selected snapshot is in use as indicated in step 624. If the selected snapshot is not in use, then the selected snapshot is recycled as indicated in step 618. If the selected snapshot is in use, then the selected snapshot is exempted from the snapshot retention count limit as indicated in step 626. Exempting the selected snapshot from the retention count limit results in an apparent reduction of the total number of retained snapshots by reducing the number of retained snapshots that are counted so the retention count limit is no longer exceeded. The targetless snapshot scheduler monitors the state of the exempted snapshot as indicated in step 628 and when the exempted snapshot is no longer in use it is discarded in the background as indicated in step 630. If an exempted snapshot is still in use when a subsequent new snapshot is created, then the exempted snapshot is not considered. Consequently, the exempted snapshot is not (counted) against the retention count limit and the next oldest snapshot is selected in step 620.

Figure 8:
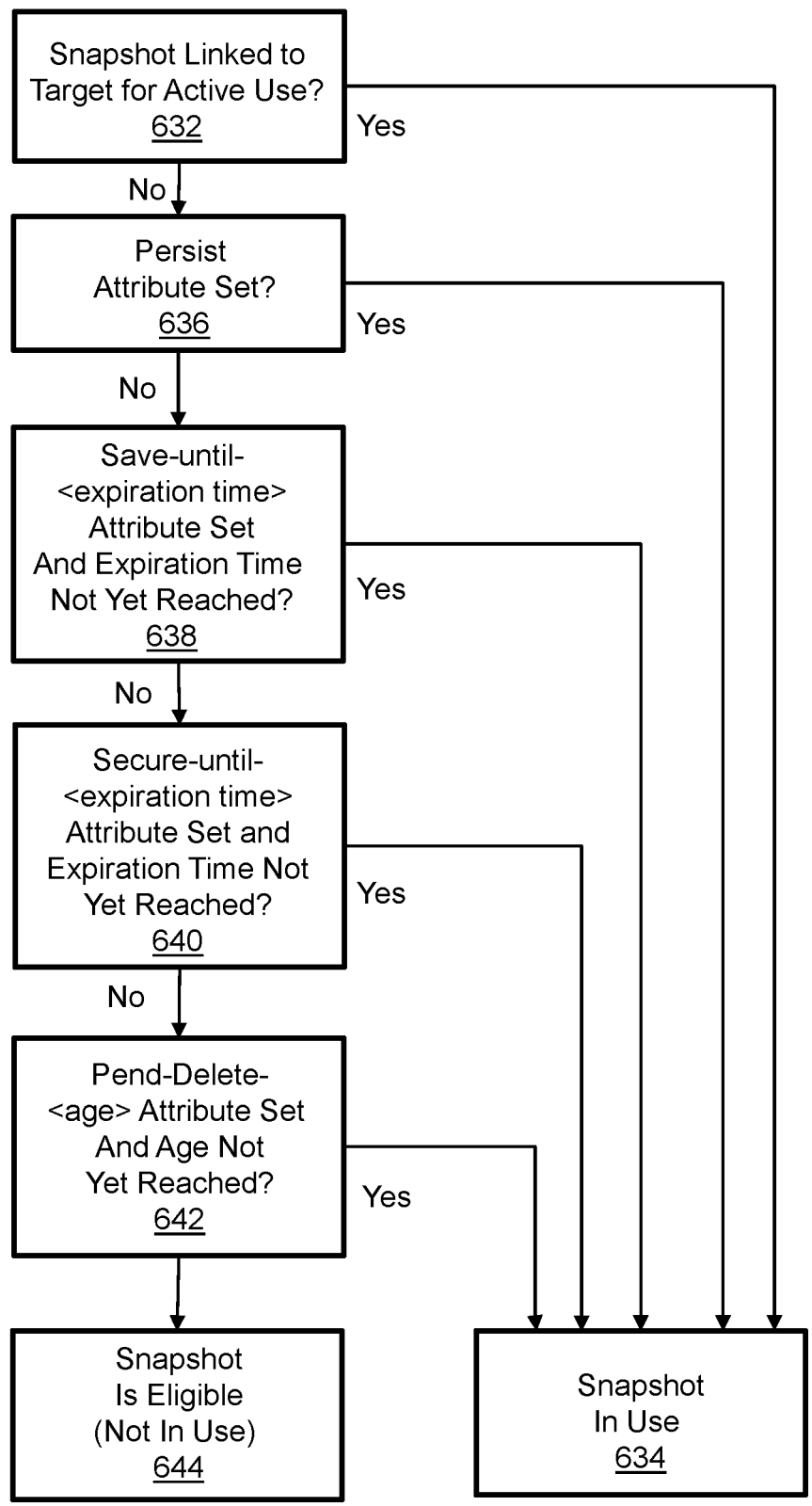
FIG. 8 illustrates the targetless snapshot eligibility determination in greater detail.

FIG. 8 illustrates the targetless snapshot eligibility determination in greater detail. Targetless snapshots that are excluded from discard or in actual use are considered ineligible for recycling. Step 632 is determining whether the snapshot is linked to a target volume for active use. If the snapshot is linked to a target volume, then the snapshot is considered to be in use as indicated in step 634. If the snapshot is not linked to a target volume, then step 636 is determining whether the persist attribute is set. If the persist attribute is set, then the snapshot is considered to be in use as indicated in step 634. If the persist attribute is not set, then step 638 is determining whether the save-until-<expiration time> attribute is set, and the expiration time has not yet been reached. If that evaluates to true (yes), then the snapshot is considered to be in use as indicated in step 634. If that evaluates to false (no), then step 640 is determining whether the secure-until-<expiration time> attribute is set, and the expiration time has not yet been reached. If that evaluates to true, then the snapshot is considered to be in use as indicated in step 634. If that evaluates to false, then step 642 is determining whether the pend-delete-<age> attribute is set, and the age has not yet been reached. If that evaluates to true, then the snapshot is considered to be in use as indicated in step 634. If that evaluates to false, then the snapshot is considered to be eligible for recycling, i.e. not in use, as indicated in step 644.

Figure 9A:
FIG. 9A illustrates a series of targetless snapshots of a single storage object created pursuant to one schedule.

FIG. 9A illustrates a series of targetless snapshots of a single storage object created pursuant to one schedule. Specifically, the state of the series of targetless snapshots is shown at a point-in-time of 08:20 for a schedule characterized by a snap interval of 5 minutes and a count=5.

Figure 9B:
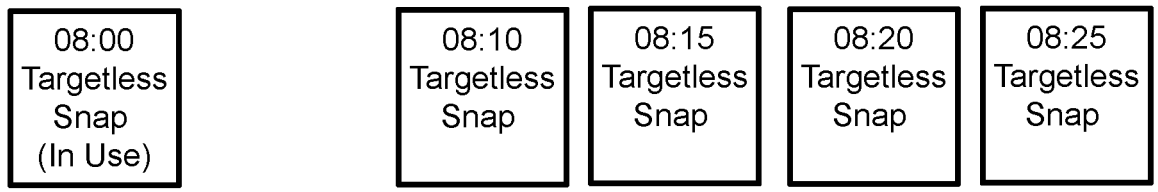
FIG. 9B illustrates application of cannibalistic recycling to the series of targetless snapshots of FIG. 9A.

FIG. 9B illustrates application of cannibalistic recycling to the series of targetless snapshots of FIG. 9A. Specifically, the state of the series of targetless snapshots is shown at a point-in-time of 08:25. In order to allow creation of a new 08:25 targetless snapshot without exceeding the count, the oldest snapshot that is not in use, namely the 08:05 snapshot, has been selected and recycled. The 08:00 targetless snapshot was not discarded by the cannibalistic recycling algorithm because it is in use.

Figure 9C:
FIG. 9C illustrates application of compliance recycling to the series of targetless snapshots of FIG. 9A.

FIG. 9C illustrates application of compliance recycling to the series of targetless snapshots of FIG. 9A. Specifically, the state of the series of targetless snapshots is shown at a point-in-time of 08:25. The oldest snapshot, namely the 08:00 targetless snapshot, is excluded from the count because it is in use. There are six targetless snapshots in the series but only five of those snapshots are considered against the count because the 08:00 snapshot has been excluded. Consequently, creation of a new 08:25 targetless snapshot without exceeding the count is achieved without discarding any of the existing snapshots. When the 08:00 targetless snapshot is no longer in use it is recycled in the background.

A variety of commands may be issued by a user or automatically by the targetless snapshot scheduler to manage the targetless snapshots created and maintained by the storage system. Previously it was common practice to consider and select individual targetless snapshots for expedited discard. The presently disclosed commands enable greater efficiency via applicability to multiple storage objects, schedules, or both. For example, commands may have global scope, a scope limited to one or more storage objects, a scope limited to one or more schedules, and combinations thereof.

Figure 10:
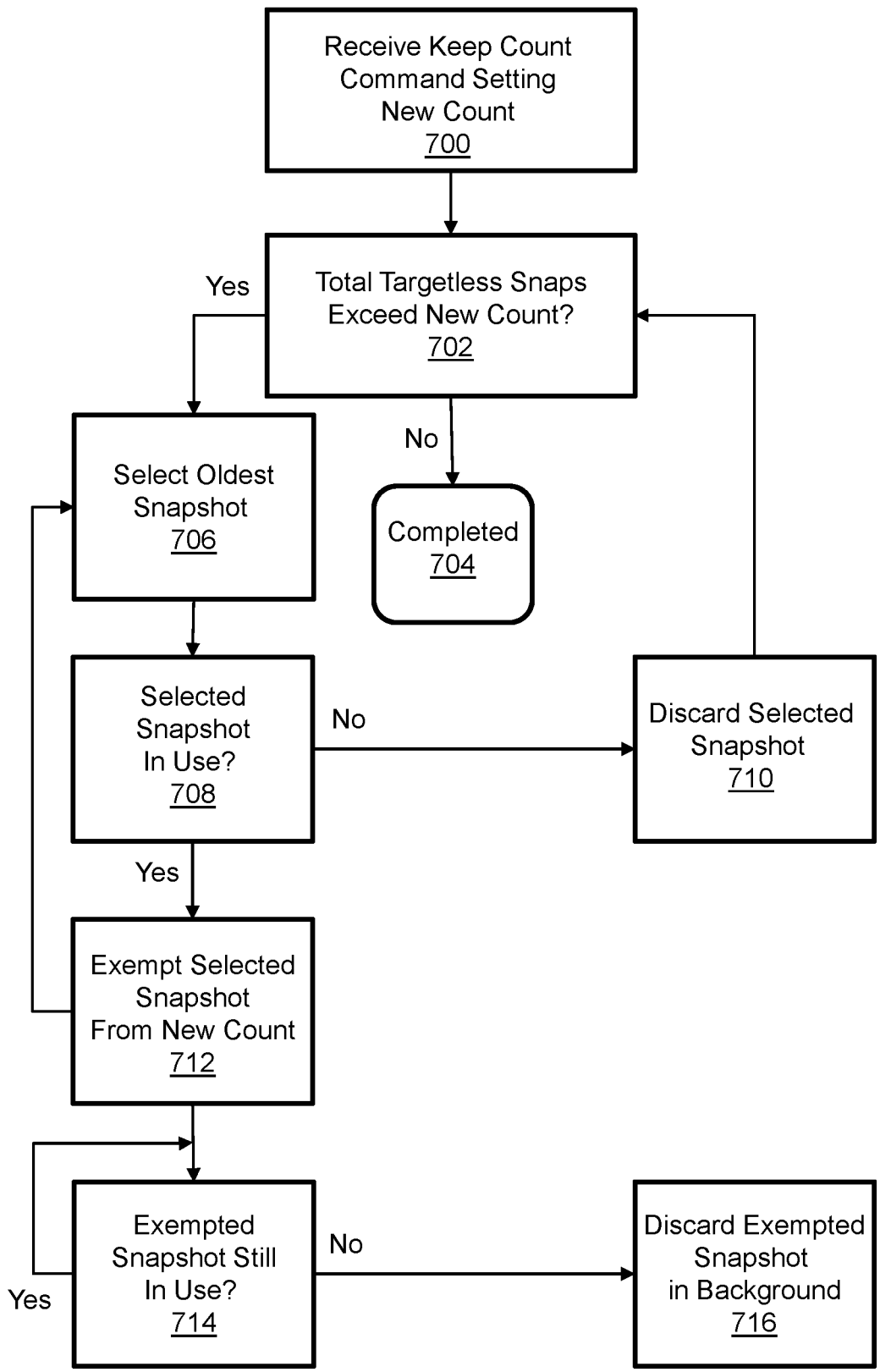
FIG. 10 illustrates operation of a count update command.

FIG. 10 illustrates operation of a Keep Count command. The Keep Count command applies a new count value for one or more specified schedules for one or more specified storage objects. Following receipt of a Keep Count command as shown in step 700 the targetless snapshot scheduler determines whether the total number of targetless snaps for a storage object schedule exceeds the new count indicated in the keep count command as indicated in step 702. The new count may be greater or lesser than the count being replaced. If the new count is not exceeded, then the command is considered to be completed as indicated in step 704. This may occur if, for example, the new count is greater than the previous count. The selected recycling algorithms continue to be applied as new snaps are created, albeit using the new count. If the total number of targetless snaps exceeds the new count, then the oldest snapshot is selected as indicated in step 706. The targetless snapshot scheduler determines whether the selected snapshot is in use as indicated in step 708. If the selected snapshot is not in use, then it is discarded as indicated in step 710. Flow then returns to step 702 to determine whether the total number of targetless snapshots still exceeds the new count. If the selected snapshot is determined in step 708 to be in use, then the selected snapshot is exempted from the new count as indicated in step 712. Exempting the selected snapshot from the snapshot count may also include setting the pend-delete attribute 510 (FIG. 5) for that targetless snapshot. Flow splits at this point by both selecting the oldest (non-exempted) snapshot in step 706 and monitoring for the state of the exempted snapshot as indicated in step 714. When the exempted snapshot is no longer in use it is discarded in the background as indicated in step 716. The process discards snapshots that are not in use until the new count is not exceeded or the supply of snapshots eligible for recycling is exhausted.

Figure 11:
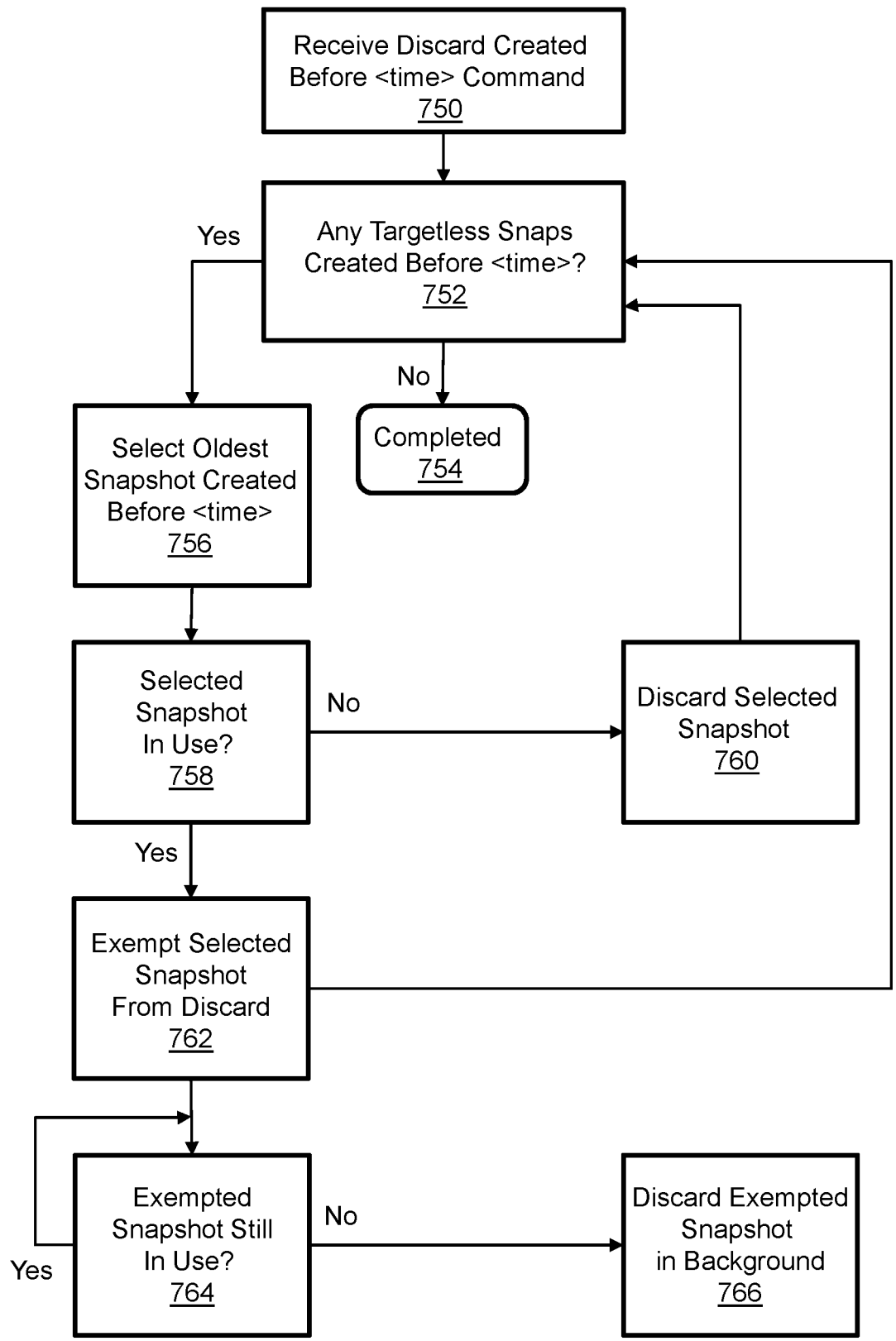
FIG. 11 illustrates operation of a point-in-time-based discard command.

FIG. 11 illustrates operation of a Point-In-Time Discard command. The Point-In-Time Discard command prompts discard of snapshots that were created prior to a specified point in time, <time>. Following receipt of a Point-In-Time Discard command as shown in step 750 the targetless snapshot scheduler determines whether any targetless snapshots were created prior to the time specified in the command as indicated in step 752. If no targetless snapshots were created prior to the time specified in the command, then the command is considered to be completed as indicated in step 754. If at least one targetless snapshot was created prior to the time specified in the command, then the oldest snapshot created before the specified time is selected as indicated in step 756. If the selected snapshot is not in use as determined in step 758 then the selected snapshot is discarded as indicated in step 760 and the process loops back to step 752. If the selected snapshot is in use, then it is exempted from discard as indicated in step 762. Exempting the selected snapshot from discard may also include setting the pend-delete attribute 510 (FIG. 5) for that targetless snapshot. The targetless snapshot scheduler monitors the state of the exempted snapshot as indicated in step 764 and when the exempted snapshot is no longer in use it is discarded in the background as indicated in step 766.

Figure 12:
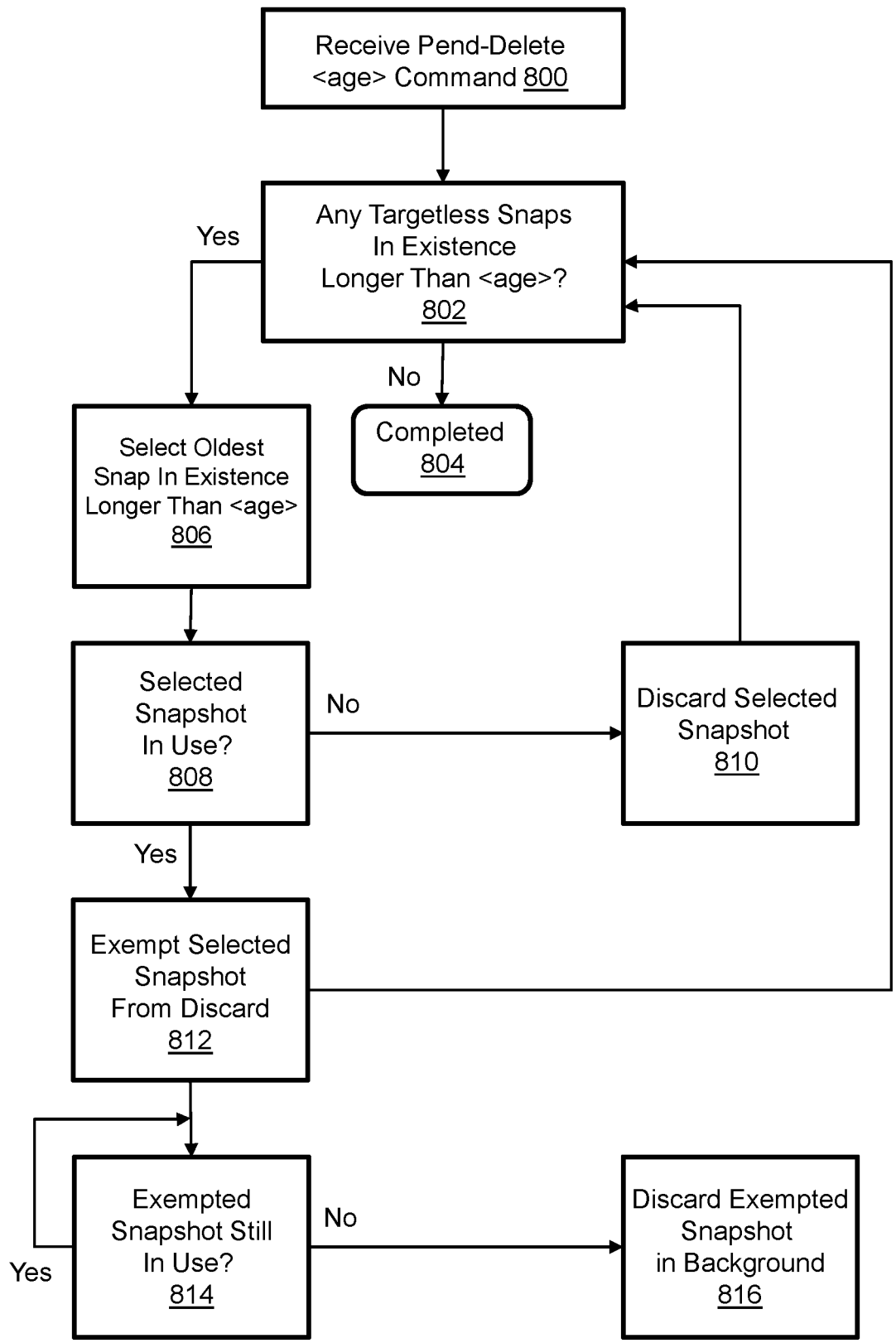
FIG. 12 illustrates operation of an age-based discard command.

FIG. 12 illustrates operation of an Age-Based Discard command. The Age-Based Discard command prompts discard of snapshots that are older than a specified age since creation. Following receipt of an Age-Based Discard command as shown in step 800 the targetless snapshot scheduler determines whether any targetless snapshots have been in existence for longer than a specified age as indicated in step 802. For context, and without limitation, the age could be some number of minutes, hours, or days. If no targetless snapshots are older than the specified age, then the command is considered to be completed as indicated in step 804. If at least one targetless snapshot is older than the specified age, then the oldest snapshot created before the specified time is selected as indicated in step 806. If the selected snapshot is not in use, then the selected snapshot is discarded as indicated in step 810 and the process loops back to step 802. If the selected snapshot is in use, then it is exempted from discard as indicated in step 812. Exempting the selected snapshot from discard may also include setting the pend-delete attribute 510 (FIG. 5) for that targetless snapshot. The targetless snapshot scheduler monitors the state of the exempted snapshot as indicated in step 814 and when the exempted snapshot is no longer in use it is discarded in the background as indicated in step 816.

Figure 13:
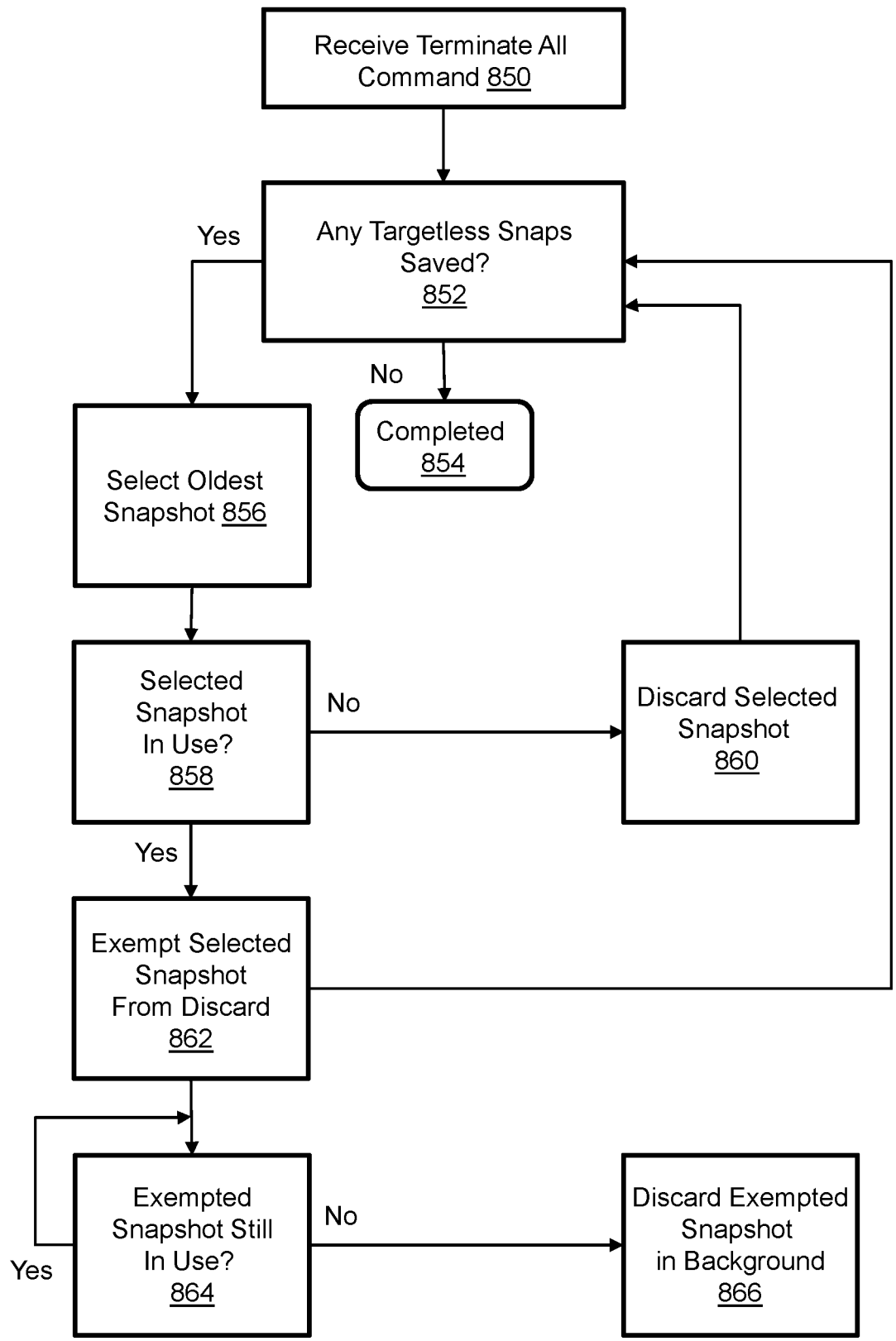
FIG. 13 illustrates operation of a terminate all command.

FIG. 13 illustrates operation of a Terminate All command. The Terminate All command prompts discard of all targetless snapshots that are not in use. Following receipt of a Terminate All command as shown in step 850 the targetless snapshot scheduler determines whether there are any saved targetless snapshots as indicated in step 852. Exempted targetless snapshots are not considered. If no targetless snapshots remain saved, then the command is considered to be completed as indicated in step 854. If at least one targetless snapshot is saved, then the oldest snapshot is selected as indicated in step 856. If the selected snapshot is not in use, then it is discarded as indicated in step 860 and the process loops back to step 852. If the selected snapshot is in use, then it is exempted from discard as indicated in step 862. Exempting the selected snapshot from discard may also include setting the pend-delete attribute 510 (FIG. 5) for that targetless snapshot. The targetless snapshot scheduler monitors the state of the exempted snapshot as indicated in step 864 and when the exempted snapshot is no longer in use it is discarded in the background as indicated in step 866.

Figure 14A:
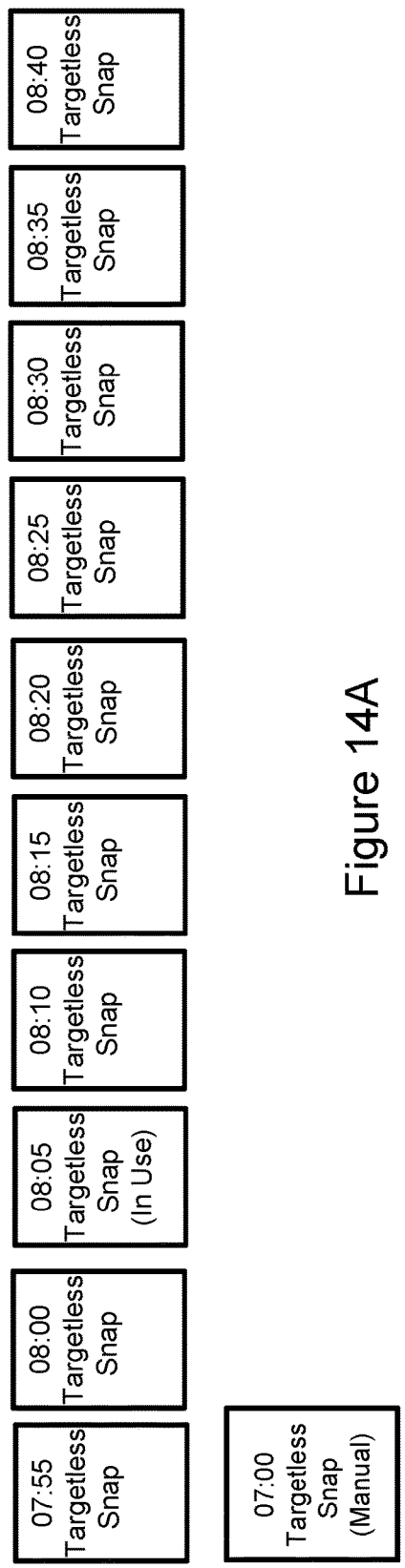
FIG. 14A illustrates a series of targetless snapshots of a single storage object created pursuant to one schedule.

FIG. 14A illustrates a series of targetless snapshots of a single storage object created pursuant to one schedule. The schedule is characterized by a count of 10 and an interval of 5 minutes. At a time 08:40 there are ten targetless snapshots that have been automatically created in accordance with the schedule and one 07:00 targetless snapshot that was manually created. Of the ten targetless snapshots automatically created in accordance with the schedule and 08:05 snap is in use.

Figure 14B:
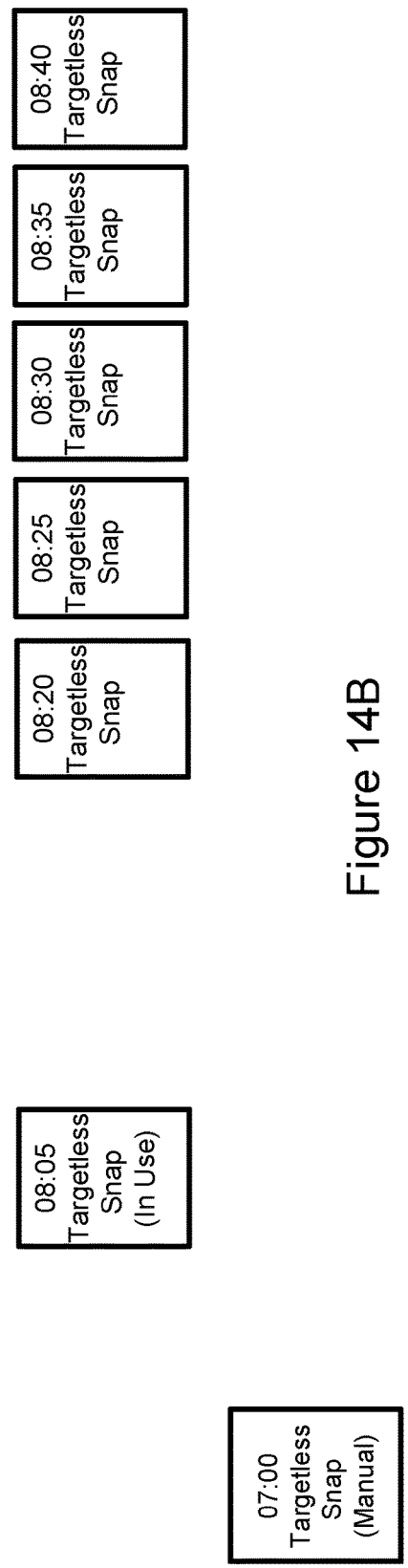
FIG. 14B illustrates application of the count update command to the series of targetless snapshots of FIG. 14A.

FIG. 14B illustrates application of a Keep Count command to the series of targetless snapshots of FIG. 14A. The Keep Count command adjusts the count from 10 to 5. The manually generated snapshot is not considered in the count and is not considered for discard. The targetless snapshot scheduler selects snaps in chronological order, starting with the oldest snap, and discards eligible snaps until the new count is achieved. Consequently, the 07:55 snap is discarded, after which the 08:00 snap is discarded, after which the 08:10 snap is discarded, after which the 08:15 snap is discarded, resulting in a count of five snaps. The 08:05 snap is exempted from discard and the count because it is in use.

FIG. 15A illustrates application of a Point-In-Time Discard command to the series of targetless snapshots of FIG. 14A. The Point-In-Time Discard command specifies that snaps created at or before 08:10 are to be discarded. The manually generated snapshot is not considered for discard. The targetless snapshot scheduler selects snaps in chronological order, starting with the oldest snap, and discards eligible snaps until the new count is achieved. Consequently, the 07:55 snap is discarded, after which the 08:00 snap is discarded, after which the 08:10 snap is discarded. The 08:05 snap is exempted from discard and the count because it is in use.

FIG. 15B illustrates application of an Age-Based Discard command to the series of targetless snapshots of FIG. 14A. The Age-Based Discard command indicates that snaps that are greater than 25 minutes old are discarded. The Age-Based Discard command is optionally paired with a pend-delete command that indicates a point-in-time when the selected eligible snaps will be discarded. The manually generated snapshot is not considered for discard. The targetless snapshot scheduler selects snaps in chronological order, starting with the oldest snap, and marks the snaps pend-delete based on age. Consequently, the 07:55 snap, 08:00 snap, 08:05 snap, and 08:10 snap are marked pend-delete. The 08:05 snap is exempted from discard until it is no longer in use.

FIG. 16 illustrates application of a Terminate All command to the series of targetless snapshots of FIG. 14A. The manually generated snapshot is not considered for discard. The targetless snapshot scheduler selects snaps in chronological order, starting with the oldest snap, and discards the eligible snaps. The 08:05 snap is exempted from discard until it is no longer in use.

Specific examples have been presented to provide context and convey inventive concepts. The specific examples are not to be considered as limiting. A wide variety of modifications may be made without departing from the scope of the inventive concepts described herein. Moreover, the features, aspects, and implementations described herein may be combined in any technically possible way. Accordingly, modifications and combinations are within the scope of the following claims.

What is claimed is:

1. An apparatus comprising:
   a data storage system comprising:
      a plurality of compute nodes interconnected with a plurality of drives;
      a plurality of storage objects on which data is logically stored, the storage objects being backed by the drives; and
      a targetless snapshot scheduler that controls creation of targetless snapshots of a first one of the storage objects by creating volume-less snapshot deltas, the targetless snapshot scheduler comprising:
         snapshot creation instructions that create targetless snapshots of the first storage object without use of a snap volume in accordance with a first schedule associated with the first storage object; and
         snapshot recycling instructions that:
            determine whether a total number of targetless snapshots of the first storage object based on the first schedule inclusive of a new targetless snapshot exceeds a predetermined count; and
            responsive to a determination that the total number of targetless snapshots of the first storage object based on the first schedule inclusive of the new targetless snapshot exceeds the predetermined count:
               select an oldest one of the targetless snapshots of the first storage object based on the first schedule;
               discard the selected snapshot responsive to a determination that the selected snapshot is not linked to a target volume; and
               exempt the selected snapshot from consideration relative to the predetermined count responsive to a determination that the selected snapshot is linked to the target volume.

2. The apparatus of claim 1 wherein the snapshot recycling instructions comprise background discard instructions that recycle the exempted snapshot responsive to a determination that the exempted snapshot is no longer in use.

3. The apparatus of claim 2 wherein the snapshot recycling instructions comprise eligibility determination instructions that characterize the selected targetless snapshot as being in use responsive to determining that the selected targetless snapshot is linked to a target volume.

4. The apparatus of claim 2 wherein the snapshot recycling instructions comprise eligibility determination instructions that characterize the selected targetless snapshot as being in use responsive to determining that a persist attribute is set.

5. The apparatus of claim 2 wherein the snapshot recycling instructions comprise eligibility determination instructions that characterize the selected targetless snapshot as being in use responsive to a determination that an expiration time attribute is set and the expiration time has not yet been reached.

6. The apparatus of claim 2 wherein the snapshot recycling instructions comprise eligibility determination instructions that characterize the selected targetless snapshot as being in use responsive to a determination that an age limit attribute is set and the age has not yet been reached.

7. The apparatus of claim 1 wherein the snapshot recycling instructions are responsive to a keep count command that resets the predetermined count to a new count to determine whether the total number of targetless snapshots of the first storage object based on the first schedule exceeds the new count and, responsive to a determination that the total number of targetless snapshots of the first storage object based on the first schedule inclusive of the new targetless snapshot exceeds the new count:
   exempt ones of the targetless snapshots that are in use;
   select ones of the targetless snapshots that are not exempt, in descending order by age, until a total number of targetless snapshots of the first storage object based on the first schedule inclusive of the new targetless snapshot and exclusive of the exempt targetless snapshots and selected targetless snapshots does not exceed the new count; and
   discard the selected targetless snapshots.

8. The apparatus of claim 1 wherein the snapshot recycling instructions are responsive to a temporal discard command to:
   exempt ones of the targetless snapshots that are in use;
   select ones of the targetless snapshots that are not exempt and were created before a specified time; and
   discard the selected targetless snapshots.

9. The apparatus of claim 1 wherein the snapshot recycling instructions are responsive to a terminate all command to:
   exempt ones of the targetless snapshots that are in use;
   select ones of the targetless snapshots that are not exempt; and
   discard the selected targetless snapshots.

10. A method comprising:
    in a data storage system comprising a plurality of compute nodes interconnected with a plurality of drives and a first storage object on which data is logically stored, the first storage object being backed by the drives:
       creating targetless snapshots of the first storage object without use of a snap volume in accordance with a first schedule associated with the first storage object by creating volume-less snapshot deltas;
       determining whether a total number of targetless snapshots of the first storage object based on the first schedule inclusive of a new targetless snapshot exceeds a predetermined count; and
       responsive to determining that the total number of targetless snapshots of the first storage object based on the first schedule inclusive of the new targetless snapshot exceeds the predetermined count:
   selecting an oldest one of the targetless snapshots of the first storage object based on the first schedule;
   discarding the selected snapshot responsive to determining that the selected snapshot is not linked to a target volume; and
   exempting the selected snapshot from consideration relative to the predetermined count responsive to determining that the selected snapshot is linked to a target volume.

11. The method of claim 10 comprising recycling the exempted snapshot responsive to determining that the exempted snapshot is no longer in use.

12. The method of claim 11 comprising characterizing the selected targetless snapshot as being in use responsive to determining that the selected targetless snapshot is linked to a target volume.

13. The method of claim 11 comprising characterizing the selected targetless snapshot as being in use responsive to determining that a persist attribute is set.

14. The method of claim 11 comprising characterizing the selected targetless snapshot as being in use responsive to determining that an expiration time attribute is set and the expiration time has not yet been reached.

15. The method of claim 11 comprising characterizing the selected targetless snapshot as being in use responsive to a determination that an age limit attribute is set and the age has not yet been reached.

16. The method of claim 10 comprising resetting the predetermined count to a new count and responsive to determining that the total number of targetless snapshots of the first storage object based on the first schedule inclusive of the new targetless snapshot exceeds the new count:
   exempting ones of the targetless snapshots that are in use;
   selecting ones of the targetless snapshots that are not exempt, in descending order by age, until a total number of targetless snapshots of the first storage object based on the first schedule inclusive of the new targetless snapshot and exclusive of the exempt targetless snapshots and selected targetless snapshots does not exceed the new count; and
   discarding the selected targetless snapshots.

17. The method of claim 10 comprising responding to a temporal discard command by:
   exempting ones of the targetless snapshots that are in use;
   selecting ones of the targetless snapshots that are not exempt and were created before a specified time; and
   discarding the selected targetless snapshots.

18. The method of claim 10 comprising responding to a terminate all command by:
   exempting ones of the targetless snapshots that are in use;
   selecting ones of the targetless snapshots that are not exempt; and
   discarding the selected targetless snapshots.

19. A non-transitory computer-readable storage medium storing instructions that when executed by a computer cause the computer to perform a method for using a computer system to manage targetless snapshots, the method comprising:
   creating targetless snapshots of a storage object without use of a snap volume in accordance with a schedule associated with the storage object by creating volumeless snapshot deltas;
   determining whether a total number of targetless snapshots of the storage object based on the schedule inclusive of a new targetless snapshot exceeds a predetermined count; and
   responsive to determining that the total number of targetless snapshots of the storage object based on the schedule inclusive of the new targetless snapshot exceeds the predetermined count:
      selecting an oldest one of the targetless snapshots of the storage object based on the schedule;
      discarding the selected snapshot responsive to determining that the selected snapshot is not linked to a target volume; and
      exempting the selected snapshot from consideration relative to the predetermined count responsive to determining that the selected snapshot is linked to a target volume.

20. The non-transitory computer-readable storage medium of claim 19 wherein the method further comprises recycling the exempted snapshot responsive to determining that the exempted snapshot is no longer in use.

* * * * *